United States Patent [19]
Ogasawara

[11] Patent Number: 6,055,601
[45] Date of Patent: Apr. 25, 2000

[54] DATA RECEIVING APPARATUS CAPABLE OF WRITING ONLY NECESSARY DATA IN A FILE AT THE TIME OF DATA RECEPTION

[75] Inventor: Satoshi Ogasawara, Hanno, Japan

[73] Assignee: Casio Computer Co., Ltd., Tokyo, Japan

[21] Appl. No.: 08/849,594

[22] PCT Filed: Oct. 15, 1996

[86] PCT No.: PCT/JP96/02980

§ 371 Date: May 28, 1997

§ 102(e) Date: May 28, 1997

[87] PCT Pub. No.: WO97/15134

PCT Pub. Date: Apr. 24, 1997

[30] Foreign Application Priority Data

Oct. 17, 1995 [JP] Japan ................................. 7-294923

[51] Int. Cl.[7] ............................. G06F 13/00; H04J 3/24; H04L 12/56
[52] U.S. Cl. ........................... 711/100; 711/154; 370/474
[58] Field of Search .................................. 711/100, 154; 375/369; 370/474, 476; 395/842, 852, 200.46, 200.42, 200.61, 200.67, 200.78; 710/22, 32; 709/216, 212, 231, 237, 238

[56] References Cited

U.S. PATENT DOCUMENTS

| | | | |
|---|---|---|---|
| 4,680,755 | 7/1987 | Reames | 370/474 |
| 4,901,312 | 2/1990 | Hui et al. | 370/474 |
| 5,293,378 | 3/1994 | Shimizu | 370/474 |
| 5,436,892 | 7/1995 | Tago et al. | 370/474 |
| 5,602,853 | 2/1997 | Ben-Michael et al. | 370/474 |

OTHER PUBLICATIONS

Tanenbaum, Andrew S; Computer Networks; 1988; second edition; Prentice–Hall Int'l., Englewood Cliffs, New Jersey, U.S.A., pp. 1–27.

*Primary Examiner*—Glenn Gossage
*Attorney, Agent, or Firm*—Frishauf, Holtz, Goodman, Langer & Chick, P.C.

[57] ABSTRACT

A data receiving apparatus writes only a necessary part of data received via a communication network or the like in a file. Start indicating information and end indicating information located before and after character string data to be downloaded are previously stored or registered in a RAM (random access memory) of a personal computer. Character string data received via a communication control section is temporarily stored in a reception buffer, and the start indicating information and end indicating information are detected from the received character string data. Then, character string data located between the start indicating information and end indicating information is extracted from the received character string data and the extracted character string data is downloaded into a file. Since a necessary part of the received data is written in a file, the file size is prevented from increasing and a user need not instruct the start and end of the desired character string data to be received, thus significantly simplifying the instructing operation.

11 Claims, 5 Drawing Sheets

6,055,601

DATA RECEIVING APPARATUS CAPABLE OF WRITING ONLY NECESSARY DATA IN A FILE AT THE TIME OF DATA RECEPTION

TECHNICAL FIELD

The present invention relates to a data receiving apparatus which stores data, received via a communication network or the like, into a file.

BACKGROUND ART

There is a conventional communication system which uses an information processing apparatus, such as a word processor or a personal computer, connected via a modem or the like to a telephone line or which has such information processing apparatuses serially connected together using RS-232C (as defined by the Electronic Industries Alliance) or the like. Such a system stores data of a string of characters (hereinafter called "character string data") that has been received through communication in a file in an external storage section that comprises, for example, a floppy disk drive (FDD) in order to record the received data. In the case where an information processing apparatus is connected to a BBS (Bulletin Board System) to receive (or download) necessary information, all the data from the declaration of the beginning of reception until the declaration of the end of the reception is written in a file in an FDD or the like. That is, a text including menus and messages and control data as well as the necessary character string data which is to be received from the host side are written in a file.

As such, unnecessary text and control data or the like besides the necessary character string data are written in a file at the time of reception, and the conventional data receiving apparatus needs a large file and thus suffers from ineffective use of its memory.

In order to receive only needed information and thereby prevent the file size from increasing, it is necessary to finely instruct the declaration of the beginning of reception and the declaration of the end of the reception. Such an instruction is likely to result in an erroneous operation and involves a tiresome operation.

DISCLOSURE OF INVENTION

Accordingly, it is an object of the present invention to provide a data receiving apparatus capable of writing only necessary data in a file at the time of writing received data in the file.

To achieve the above object, according to the first aspect of this invention, there is provided a data receiving apparatus for receiving data via a communication network or the like and storing the data, which comprises:

storage means (FIG. 1, RAM 6 and FIG. 2, sections 6b–6d) for storing start information indicating a start of data extraction and end information indicating a termination of the data extraction;

extracting means (FIG. 1, CPU 2 and FIG. 6, steps S21 and S24) for detecting a first data coincidence of the data received via the communication network with said start information and a second data coincidence of the data received via the communication network with said end information, and for extracting from therebetween necessary data from the data received via the communication network; and file forming means (FIG. 1, CPU 2 and FIG. 6, steps S23, S25, and S26) for forming a file including said necessary data extracted by said extracting means.

According to the second aspect of this invention, there is provided a data receiving apparatus for receiving data via a communication network or the like and storing the data, which comprises:

storage means (FIG. 1, RAM 6 and FIG. 2, sections 6b–6d) for storing start information indicating a start of data extraction and end information indicating a termination of the data extraction;

detection means (FIG. 1, CPU 2 and FIG. 6, steps S21 and S24) for detecting a first data coincidence of the data received via the communication network with said start information and a second data coincidence of the data received via the communication network with said end information; and write control means (FIG. 1, CPU 2 and FIG. 6, steps S22, S23, S25, S26) for, when said detection means detects the first data coincidence, opening a file and writing into said file portions of the data received via the communication network which follow said first data coincidence, and for, when said detection means detects the second data coincidence, terminating the writing of data into said file.

According to the first and second aspects of the present invention, only necessary data need be written in a file. Therefore, the size of the file does not have to be increased. Further, the operation of the apparatus is simplified.

BEST MODE FOR CARRYING OUT THE INVENTION

A preferred embodiment of the present invention will now be described specifically referring to the accompanying drawings.

FIGS. 1 through 6 are diagrams for explaining a data receiving apparatus according to one embodiment of this invention. In this embodiment, a communicatable personal computer is connected to a communication network and stores only necessary information among character string data, received via this communication network, into a storage section.

To begin with, the structure of this embodiment will be discussed.

Figure 1:
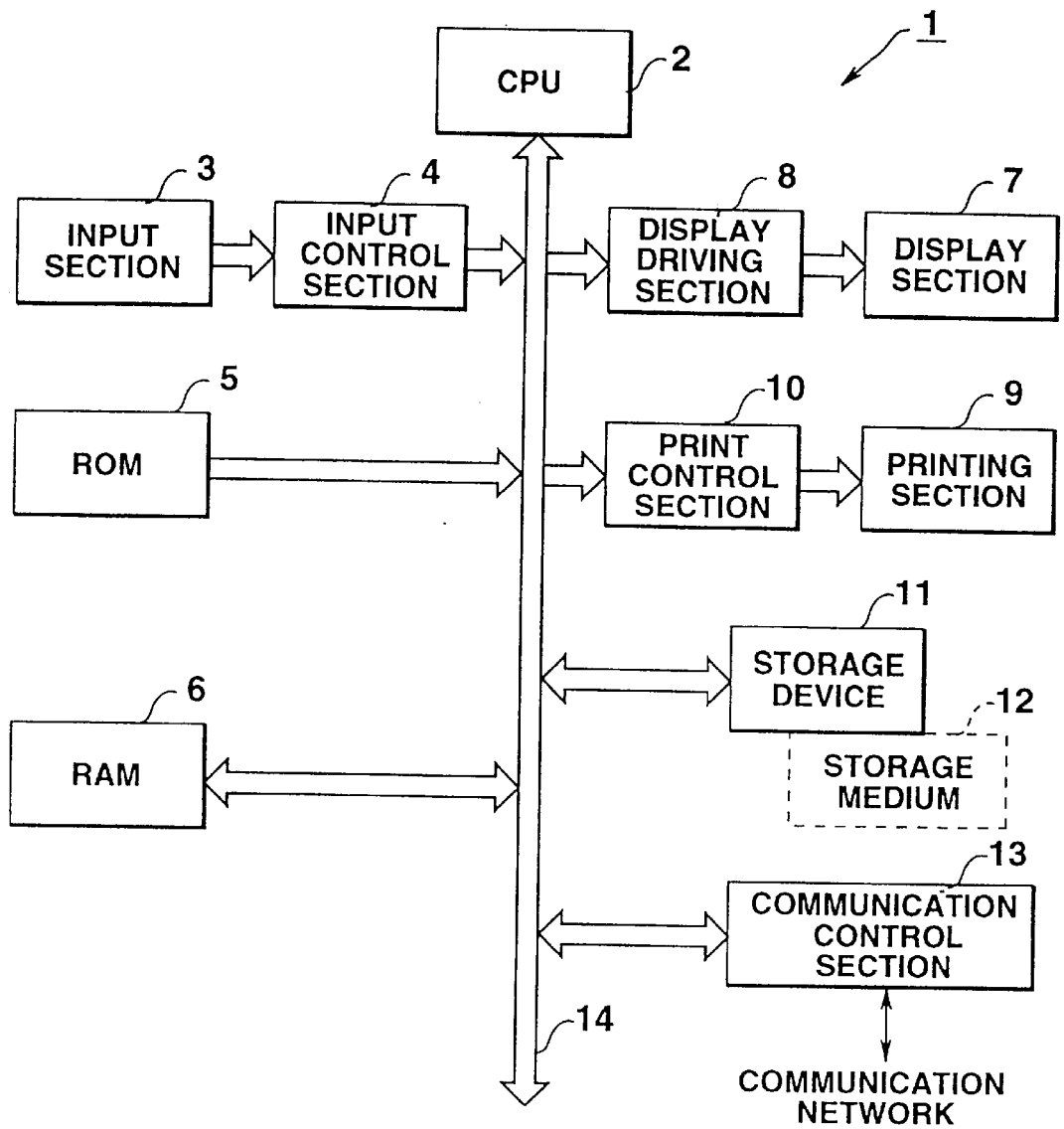
FIG. 1 is a block structural diagram illustrating the essential portions of a personal computer according to one embodiment of this invention.

FIG. 1 is a block structural diagram illustrating the essential portions of a personal computer 1 according to this embodiment.

Referring to FIG. 1, the personal computer 1 comprises a CPU (Central Processing Unit) 2, an input section 3, an input control section 4, a ROM (Read Only Memory) 5, a RAM (Random Access Memory) 6, a display section 7, a display driving section 8, a printing section 9, a print control section 10, a storage device 11 and a communication control section 13, which are mutually connected by a bus 14.

The CPU 2 controls the individual components of the personal computer 1 in accordance with various control programs stored in the ROM 5. At the time downloaded data is stored in the RAM 6, the CPU 2 detects a start character string and an end character string, previously stored in the RAM 6, from the received character string data. The CPU 2 extracts a predetermined character string based on the detected start character string and end character string and stores only the extracted character string necessary into a file (hereinafter, download-data record file). For instance, the CPU 2 performs control such that a character string following the start character string is stored in the download-data record file when it detects only the start character string, a character string up to the end character string is stored in the download-data record file when it detects only the end character string, or a character string lying between the start character string and the end character string is stored in the download-data record file when it detects both the start character string and the end character string. Although a character string excluding the start character string and the end character string is stored in this embodiment, data reception may be controlled so as to store a character string including the start character string and the end character string.

The input section 3 has function keys for setting various functions, character data keys for inputting character data, ten keys for inputting numerical data, a download key for instructing the beginning of downloading and a file designation key for designating a file where a character string is to be stored. Signals associated with the operation of those various keys are output to the CPU 2 under the control of the input control section 4.

Stored in the ROM 5 are various kinds of control programs the CPU 2 executes and various kinds of data which are to be processed at the time those control programs are executed.

Figure 2:
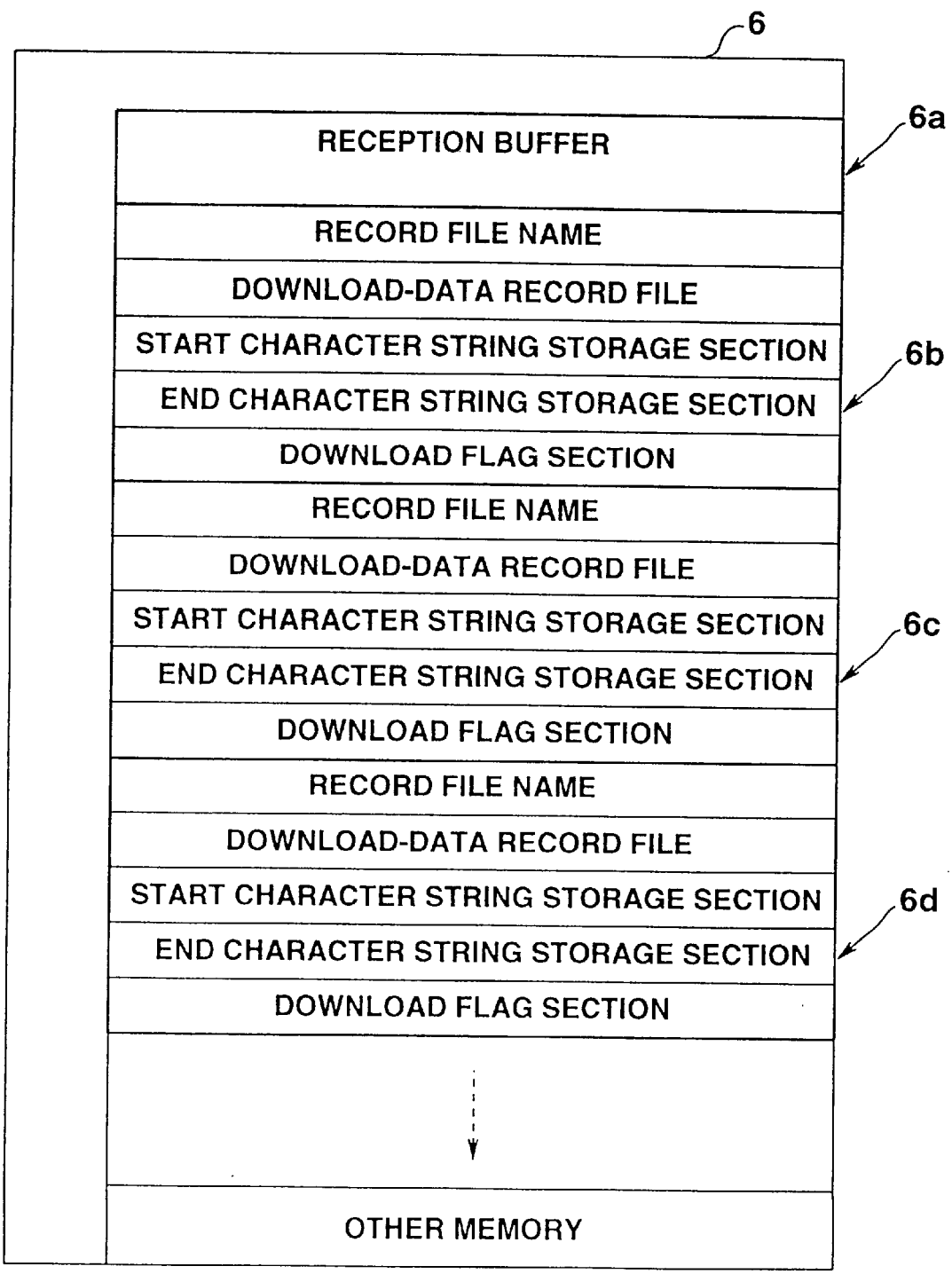
FIG. 2 is a diagram showing the memory structure of a RAM (Random Access Memory) used in this embodiment.

The RAM 6 has a work area for temporarily storing data for data processing and various parameters, and a program area for storing a program. As shown in FIG. 2, for example, the RAM 6 has a reception buffer 6a for temporarily storing data received by the personal computer 1 via a communication network, and a first record file 6b, a second record file 6c, a third record file 6d and so forth where necessary data in the received data is downloaded. Each record file area consists of a record file name for recording the name of a file, a download-data record file for recording downloaded data, a start character string storage section for storing the start character string as a reference for the beginning of necessary downloaded data, an end character string storage section for storing the end character string as a reference for the end of necessary downloaded data, and a download flag section for storing a flag representing the download state of each record file.

The display section 7 shown in FIG. 1 displays text data, image data or the like, which have been received through the input section 3 or the communication control section 13 of the personal computer 1. The display section 7, which comprises a display such as a CRT (cathode ray tube) or LCD (liquid crystal display), is driven by the display driving section 8 designed for that display.

The printing section 9 sequentially prints out character data or the like which are developed in the RAM 6, for example, under the control of the print control section 10.

The storage device 11 has a storage medium 12 where programs, data, etc. have already been stored. This storage medium 12 comprises a magnetic storage medium, an optical storage medium or a semiconductor memory. The storage medium 12 may be provided in the storage device 11 permanently or may be a removable type. The programs, data and the like stored on the storage medium 12 may be received from another apparatus which is connected via a communication network. Alternatively, the storage device 11 equipped with the storage medium 12 may be provided in another apparatus which is connected via a communication network, so that programs, data and the like stored on the storage medium 12 can be used via the communication network.

The communication control section 13 comprises an I/O (input/output) port, a modem or the like, which is connected to a communication network (analog public telephone network or digital public telephone network), and executes communication control for data such as electronic mail data which is transmitted and received through computer communication.

The bus 14 connects the aforementioned individual components to exchange control signals and data.

Figure 3:
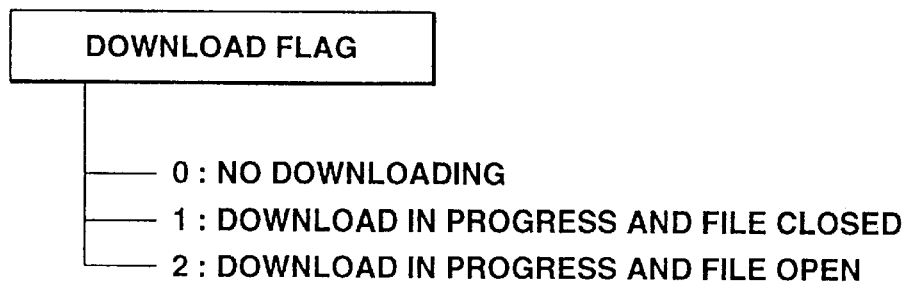
FIG. 3 is a diagram for explaining the contents of a download flag used in this embodiment.

FIG. 3 is a diagram for explaining the contents of a download flag used in this embodiment. The download flag shows the state of a record file. Such state is written in the download flag section in each record file of the RAM 6 shown in FIG. 2.

As shown in FIG. 3, the download flag of "0" indicates that there is no downloading.

When the download flag is "1", downloading is in progress while the associated record file is closed.

When the download flag is "2", downloading is in progress and the associated record file is open.

Although the download flag is defined as specified above in this embodiment, the states of the download flag are in no way limited to those types.

Figure 4:
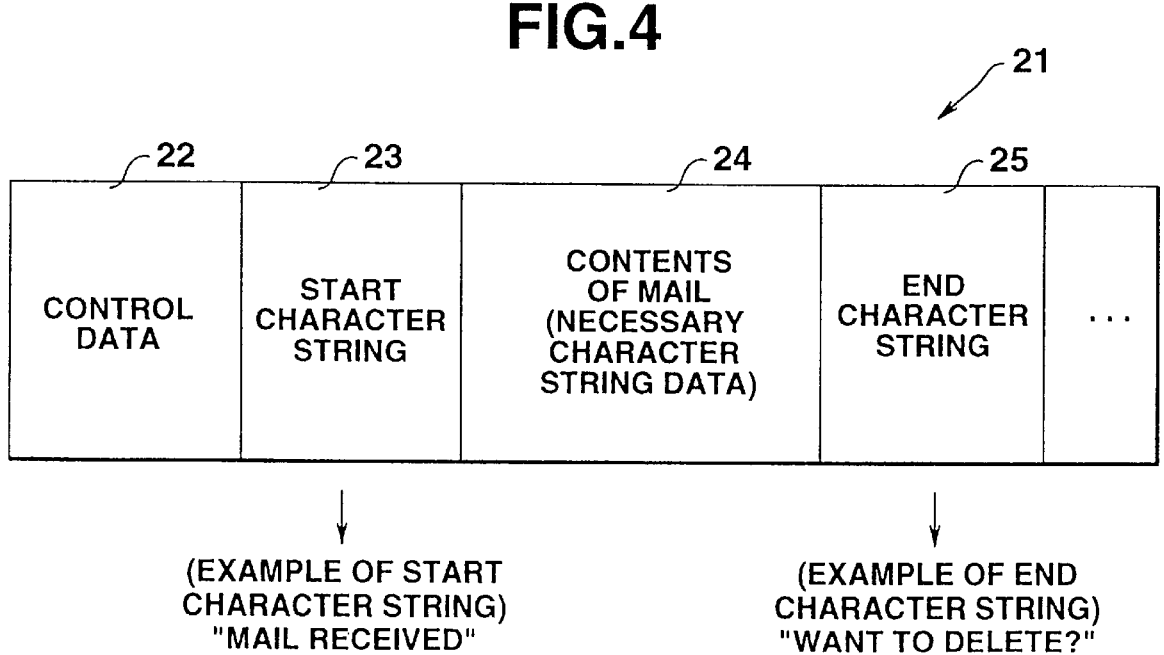
FIG. 4 is a diagram exemplifying the data structure of character string data received via a communication network.

FIG. 4 is a diagram exemplifying the data structure of received character string data 21 received via a communication network (by an electronic mail in this example).

As shown in FIG. 4, control data 22 is located at the head of the received character string data 21, followed by a start character string 23 which indicates the beginning of an electronic mail, such as a character string "mail received." Then comes contents 24 of the mail as necessary character string data, followed by an end character string 25 indicative of the end of the mail, such as a character string "want to delete?" Other character string data include a string of numerals indicating a specific symbol or a specific control code, and a character string consisting of numerals and alphabets.

As apparent from the above, necessary character string data in the received character string data 21 is just the contents 24 of a mail which should be stored in a file at the time downloading is performed. In this embodiment, therefore, the start character string 23 and the end character string 25 are extracted from the received character string data 21 so that the contents 24 of a mail or the necessary character string data, located between the start character string 23 and the end character string 25, is selectively extracted and stored in a file.

The operation of this embodiment will be described below with reference to FIGS. 5 and 6.

Figure 5:
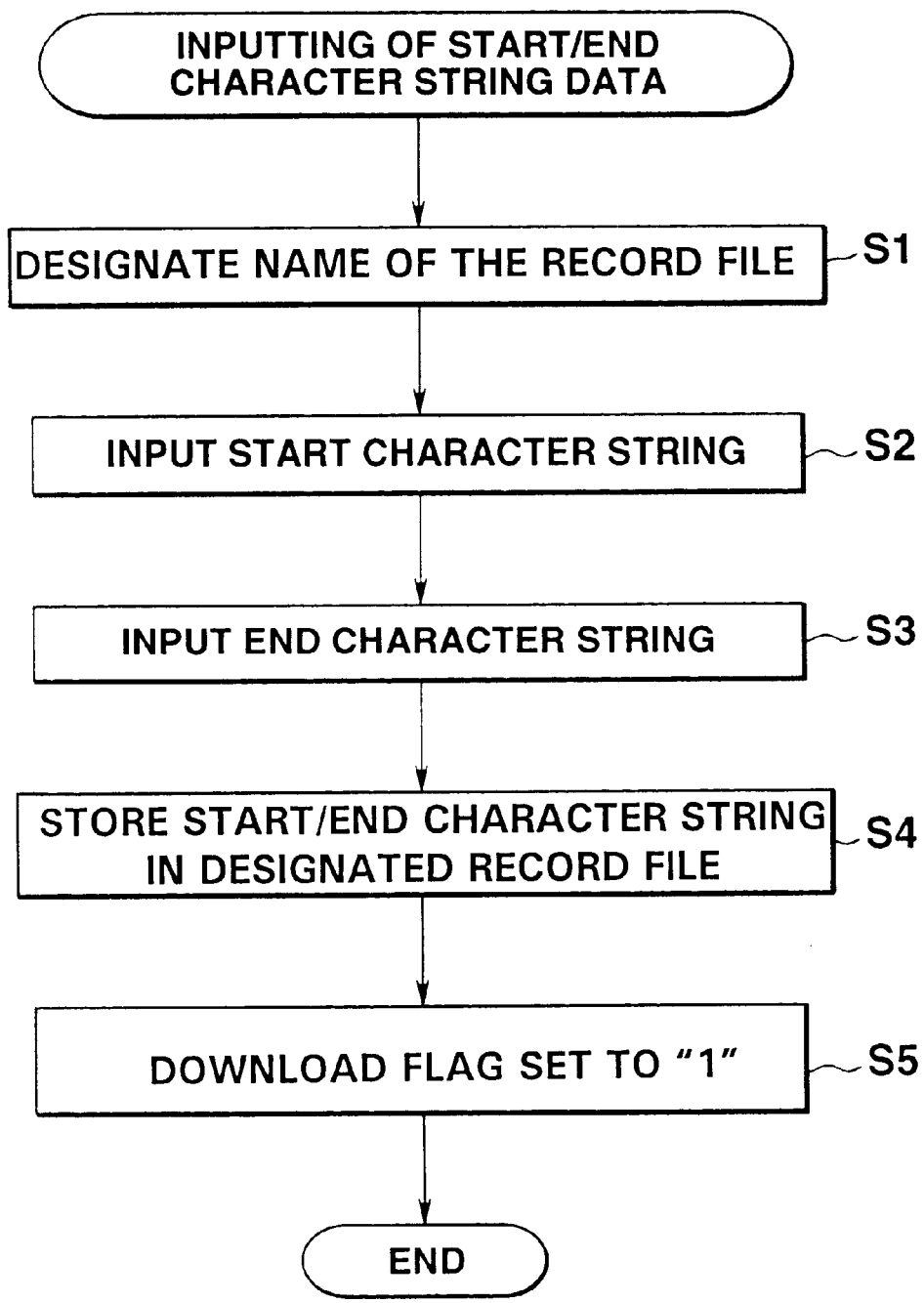
FIG. 5 is a flowchart for explaining a character string input process for storing a start character string and an end character string in a record file in the RAM.
Figure 6:
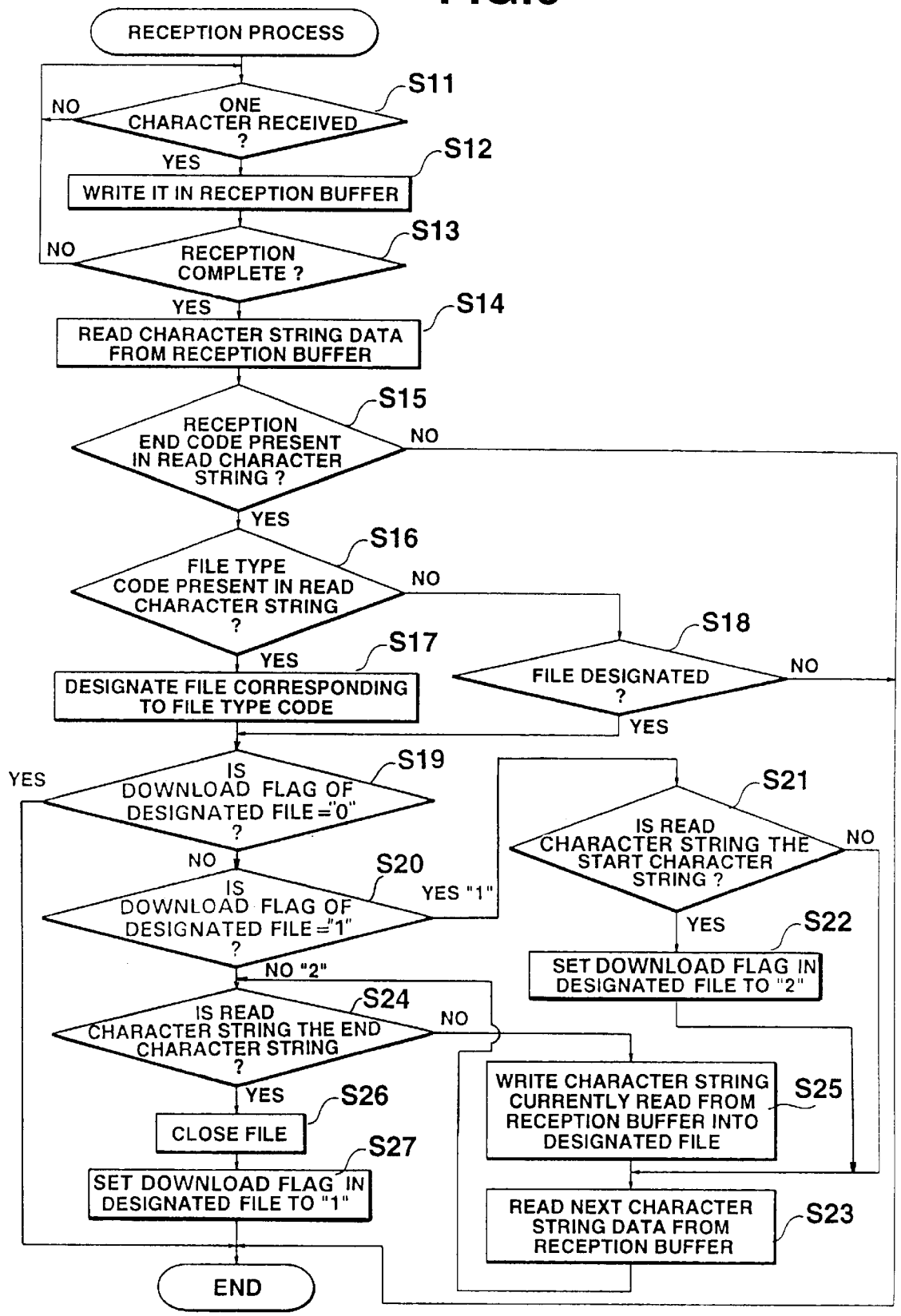
FIG. 6 is a flowchart for explaining a reception operation for receiving character string data.

FIG. 5 is a flowchart for explaining a character string input process for storing or registering a start character string and an end character string in a record file in the RAM 6, and FIG. 6 is a flowchart for explaining a reception operation for receiving character string data. The programs which accomplish the functions described in the flowcharts in FIGS. 5 and 6 are stored in the storage medium 12 in the form of program codes which can be read by the CPU 2.

In the case where received character string data is downloaded into a predetermined record file in the RAM 6 in this embodiment, a process of inputting the start and end character strings is performed in advance in the set mode shown in FIG. 5.

First, the download flags in the record files 6b, 6c, 6d and so forth in the RAM 6 shown in FIG. 2 are all cleared (not shown). Of the record files 6b, 6c, 6d, etc., the name of the one which is used to store or register the start and end character strings is designated (step S1). Then, the start character string is input (step S2) and the end character string is input (step S3) both using the input section 3.

Then, the entered start character string and end character string are stored in the start character string storage section and the end character string storage section in the record file for download in the RAM 6 which has been designated in step S1 (step S4).

When the start and end character strings are stored in this step S4, the download flag is set to "1" indicating that this record file is where downloaded data should be stored (step S5).

When the download flag in the record file is set to "1," if the received character string data contains the stored start character string, character string data following the start character string can be automatically stored in the record file.

In the reception process at the time of data downloading as shown in FIG. 6, first, it is determined in step S11 if one character has been received via the communication control section 12. When any single character has been received, the received character data is written in the reception buffer 6a in the RAM 6 (step S12). The writing of the received character data is repeated until the reception operation is completed (step S13).

When the reception operation is completed in step S13, the received character string data written in the reception buffer 6a is read out (step S14) and it is determined if the read character string data contains a reception end code (step S15). When the read character string data does not contain the reception end code, which means that complete character string data has not been received, the reception process for downloaded data is terminated.

When the read character string data contains the reception end code in step S15, the complete character string data has been received properly, and the flow proceeds to step S16 to continue the reception process for downloaded data.

It is determined in step S16 whether the read character string data contains a file type code. If this file type code is present, the record file associated with that file type code is designated (step S17) after which the flow goes to step S19.

If no file type code is present in the read character string data in step S16, no record file is designated by the type code so that the flow proceeds to step S18 to wait for a user's designation of a record file. When no user's designation is made, the process is terminated there, whereas when a user's designation is made, the flow moves to step S19.

In step S19, it is determined if the download flag in the designated file is "0." When the download flag is "0," no downloading is to be performed as shown in FIG. 3, so that the process is terminated. When the download flag in the designated file is other than "0" (either "1" or "2"), the flow proceeds to step S20 where it is determined if the download flag is "1." When the download flag is "1," the file is closed although downloading is in progress, so that it is determined in step S21 if the read character string data contains the start character string.

When the start character string is detected, the download flag in the designated file is set to "2" (step S22) to open the file and the next character string data stored in the reception buffer 6a is read out (step S23). When the read character string data does not contain the start character string in step S21, the flow immediately proceeds to step S23 without executing step S22 to read out the next character string data from the reception buffer 6a.

Then, the next character string data in the reception buffer 6a is read out in step S23 after which it is determined if the read character string data is the end character string in step S24. When it is not determined that the read character string data is the end character string, the flow goes to step S25 to write the contents of the character string currently read from the reception buffer 6a into the designated file (the download-data record file in the predetermined record file in the RAM 6), and then the next character string data is read from the reception buffer 6a in step S23. The data writing into the designated file is repeated until the end character string is detected (steps S23 to S25).

When it is determined in step S24 that the read character string is the end character string, the writing of the character string data is to be stopped, so that the designated file is closed (step S26) and the download flag in the designated file is set to "1" (step S27).

In the data receiving apparatus according to this embodiment, as described above, the start character string and the end character string have previously been stored or registered to restrict the range of data to be downloaded, making it possible to write only necessary character string data in the received data into the desired record file. This feature eliminates the need for subsequent editing after downloading and can prevent a careless erroneous operation which may otherwise be caused by such subsequent editing.

Because only necessary character string data is downloaded, a small record file is sufficient for storing or registering this character string data, thus contributing to cost reduction.

Since a plurality of record files are provided in the RAM 6 and character strings associated with those record files can be stored or registered individually in this embodiment, character strings can be recorded in the respective files purpose by purpose (i.e., in accordance with their purpose). Therefore, it is possible to automatically arrange the transmitted contents to write only necessary data in the associated record files. That is, the record files can be used distinctly in accordance with the types of data; for example, an electronic mail may be recorded in the first record file while bulletin board data is recorded in the second record file. Alternatively, files for electronic mails may be prepared sender by sender (i.e., for respective senders).

Although only one embodiment of the present invention has specifically been described herein, it should be apparent to those skilled in the art that this invention may be embodied in many other specific forms without departing from the spirit or scope of the invention.

For example, although character string data has been described as being written in a file clause by clause (i.e., as clauses such as "MAIL RECEIVED" or "WANT TO DELETE?" as shown in the examples of FIG. 4), such writing may be carried out character by character or line by line.

In addition, although the start character string and end character string are stored or registered at the time of reception (download) in the above-described embodiment, the storage or registration of such character strings may be performed with respect to a predetermined character string (i.e., when a predetermined character string is detected).

Still further, although reception (download) is described as beginning at the time reception (download) takes place in the above described embodiment, this timing is not essential. It may be defined in such a way that when a certain stored or registered character string is detected, character string data is automatically written in the associated record file.

The foregoing description of the invention has been given with reference to the case where transmitted character string data is written in a file. This invention, however, is also adaptable to the case where character string data is transferred from one file to another.

I claim:

1. A data receiving apparatus for receiving data via a communication network to store said data, comprising:

storage means for storing start information indicating a start of data extraction and end information indicating a termination of the data extraction;

extracting means for detecting a first data coincidence of the data received via the communication network with said start information and a second data coincidence of the data received via the communication network with said end information, and for extracting from therebetween necessary data from the data received via the communication network; and file forming means for forming a file including said necessary data extracted by said extracting means.

2. A data receiving apparatus according to claim 1, wherein said storage means stores a plurality of items of said start and end information corresponding to a plurality of respective files, and said file forming means stores the data extracted by said extracting means according to said start and end information into a particular file corresponding to said start and end information.

3. A data receiving apparatus according to claim 1, further comprising input means for inputting desired start and end information into said storage means.

4. A data receiving apparatus according to claim 1, further comprising file designation means for designating a given file, and wherein said file forming means stores the data extracted by said extracting means into the given file designated by said file designation means.

5. A data receiving apparatus according to claim 1, wherein:

said data received via the communication network comprises electronic mail character string data;

said storage means stores start character string data indicating the start of the data extraction and end character string data indicating the termination of the data extraction; and said extracting means detects a first character string data coincidence of the electronic mail character string data with said start character string data and a second character string data coincidence of said electronic mail character string data with said end character string data, and extracts from therebetween the necessary data from the electronic mail character string data.

6. A data receiving apparatus according to claim 1, further comprising a receiving buffer for temporarily storing the data received via the communication network, and wherein said extracting means extracts the necessary data from said receiving buffer.

7. A data receiving apparatus according to claim 1, wherein said file forming means designates a predetermined file based on contents of the data received via the communication network and stores said necessary data extracted by said extracting means into said predetermined file.

8. A data receiving apparatus according to claim 7, wherein said file forming means discriminates a file identification code included in the data received via the communication network and designates a particular file corresponding to the file identification code.

9. A data receiving apparatus for receiving data via a communication network to store said data, comprising:

storage means for storing start information indicating a start of data extraction and end information indicating a termination of the data extraction;

detection means for detecting a first data coincidence of the data received via the communication network with said start information and a second data coincidence of the data received via the communication network with said end information; and write control means for, when said detection means detects the first data coincidence, opening a file and writing into said file portions of the data received via the communication network which follow said first data coincidence, and for, when said detection means detects the second data coincidence, terminating the writing of data into said file.

10. A computer readable storage medium storing:

a program code for enabling a computer to receive data transmitted via a communication network;

a program code for enabling the computer to store start information indicating a start of data extraction and end information indicating a termination of the data extraction;

a program code for enabling the computer to detect a first data coincidence of the data received via the communication network with said start information and a second data coincidence of the data received via the communication network with said end information, and to extract from therebetween necessary data from the data received via the communication network; and a program code for enabling the computer to form a file including the extracted data.

11. A computer readable storage medium storing:

a program code for enabling a computer to receive data transmitted via a communication network;

a program code for enabling the computer to store start information indicating a start of data extraction and end information indicating a termination of the data extraction;

a program code for enabling the computer to detect a first data coincidence of the data received via the communication network with said start information and a second data coincidence of the data received via the communication network with said end information; and a program code for enabling the computer to open a file and write into said file portions of the data received via the communication network following detection of the first data coincidence, and to terminate the writing of data into said file when the second data coincidence is detected.

* * * * *